US012620718B2

(12) United States Patent
Ito

(10) Patent No.: US 12,620,718 B2
(45) Date of Patent: May 5, 2026

(54) MIMO ANTENNA DEVICE

(71) Applicant: HARADA INDUSTRY CO., LTD., Tokyo (JP)

(72) Inventor: Jun Ito, Tokyo (JP)

(73) Assignee: HARADA INDUSTRY CO., LTD., Tokyo (JP)

( * ) Notice: Subject to any disclaimer, the term of this patent is extended or adjusted under 35 U.S.C. 154(b) by 89 days.

(21) Appl. No.: 18/852,328

(22) PCT Filed: Feb. 17, 2023

(86) PCT No.: PCT/JP2023/005775
§ 371 (c)(1),
(2) Date: Sep. 27, 2024

(87) PCT Pub. No.: WO2023/188974
PCT Pub. Date: Oct. 5, 2023

(65) Prior Publication Data

US 2025/0219294 A1 Jul. 3, 2025

(30) Foreign Application Priority Data

Mar. 28, 2022 (JP) ................................ 2022-052402

(51) Int. Cl.
*H01Q 9/28* (2006.01)
*H01Q 1/52* (2006.01)
*H01Q 9/26* (2006.01)

(52) U.S. Cl.
CPC ............... *H01Q 9/28* (2013.01); *H01Q 1/521* (2013.01); *H01Q 9/26* (2013.01)

(58) Field of Classification Search
CPC ............ H01Q 1/521; H01Q 9/26; H01Q 9/28; H01Q 21/28
See application file for complete search history.

(56) References Cited

U.S. PATENT DOCUMENTS

2018/0269936 A1* 9/2018 Chen ...................... H04Q 11/06
2024/0243487 A1* 7/2024 Sone ...................... H01Q 21/24

FOREIGN PATENT DOCUMENTS

JP 2010-161959 A 7/2010
JP 2016-116016 A 6/2016
JP 2021-072626 A 5/2021

OTHER PUBLICATIONS

International Search Report in PCT/JP2023/005775, dated Apr. 25, 2023.

* cited by examiner

*Primary Examiner* — Daniel Munoz
(74) *Attorney, Agent, or Firm* — Spencer Fane, LLP

(57) ABSTRACT

A MIMO antenna device includes a front-side dipole antenna and a back-side dipole antenna. Long-side feed parts for hot element are connected respectively to feed points at their long sides. Long-side feed parts for ground element are connected respectively to the feed points at their long sides, and the long sides thereof face the long sides of the long-side feed parts for hot element in parallel with a predetermined interval. Ground elements are respectively arranged point-symmetric to hot elements with respect to the feed points in an offset manner. The front-side dipole antenna and the back-side dipole antenna are arranged such that the front-side feed point and the back-side feed point substantially overlap each other in a top view and that the long-side feed part for front-side is arranged perpendicular to the long-side feed part for back-side.

10 Claims, 3 Drawing Sheets

MIMO ANTENNA DEVICE

CROSS-REFERENCE TO RELATED APPLICATIONS

This application is a U.S. national stage application of International Application No. PCT/JP2023/005775, filed on Feb. 17, 2023. This application claims priority to Japanese Patent Application No. 2022-052402 filed on Mar. 28, 2022.

BACKGROUND

Technical Field

The present invention relates to a MIMO antenna device, and more particularly to a small-sized and broadband MIMO antenna device.

Background Information

Recently, a wide area communication network in which automobiles to actualize automatic driving utilize a mobile phone network has been promoted to increase the capacity of information to be communicated and the transmission speed thereof. For example, MIMO (Multiple-Input Multiple-Output) is known as a technology for performing spatial multiplex transmission in order to increase the information capacity and information transmission speed. In a MIMO antenna device using a plurality of antenna elements, there are many design restrictions such that it is generally necessary to ensure isolation by installing the antenna elements apart from each other. Further, in recent years, antenna mounting space inside an automobile tends to be restricted by other devices such as an airbag, and it is therefore difficult to reduce the antenna size to a level that can be mounted inside a vehicle.

Japanese Laid-Open Patent Application No. 2021-072626A (hereinafter referred to as Patent Document 1) by the same applicant as the present application is known as a MIMO antenna device capable of being mounted in such vehicles. Patent Document 1 discloses a MIMO antenna device capable of reducing interference between antennas over a wide band and being miniaturized by making first and second dipole antennas arranged front and back crossed each other.

SUMMARY

A reduction in correlation coefficient is one of the requirements required for MIMO antenna devices used for high-speed and large-capacity transmission of 5G communications. To achieve this, it is important to ensure the mutual coupling (isolation) between two antennas. While a sufficient isolation is achieved in this MIMO antenna device of Patent Document 1, a further improvement is desired for some antenna arrangement conditions.

The present invention has been made in view of the above situations, and an object thereof is to provide a MIMO antenna device capable of reducing interference between antennas over a wide band and being miniaturized.

To achieve the above object of the present invention, a MIMO antenna device according to the present invention may include: a front-side dipole antenna disposed on a front-side surface; and a back-side dipole antenna which is an antenna for the same frequency band as the front-side dipole antenna and which is disposed on a back-side surface opposite to the front-side surface. The front-side dipole antenna may include: a front-side feed point; a long-side feed part for front-side hot element connected at its long side to the front-side feed point; a front-side hot element extending from the long-side feed part for front-side hot element; a long-side feed part for front-side ground element connected at its long side to the front-side feed point, the long side facing in parallel the long side of the long-side feed part for front-side hot element with a predetermined interval; and a front-side ground element extending from the long-side feed part for front-side ground element and disposed point-symmetric to the front-side hot element with respect to the front-side feed point in an offset manner. The back-side dipole antenna may include: a back-side feed point; a long-side feed part for back-side hot element connected at its long side to the back-side feed point; a back-side hot element extending from the long-side feed part for back-side hot element; a long-side feed part for back-side ground element connected at its long side to the back-side feed point, the long side facing in parallel the long side of the long-side feed part for back-side hot element with a predetermined interval; and a back-side ground element extending from the long-side feed part for back-side ground element and disposed point-symmetric to the back-side hot element with respect to the back-side feed point in an offset manner. The front-side dipole antenna and the back-side dipole antenna may be arranged such that the front-side feed point and the back-side feed point substantially overlap each other in a top view and that the long-side feed part for front-side hot element and the long-side feed part for front-side ground element are arranged perpendicular to the long-side feed part for back-side hot element and the long-side feed part for back-side ground element.

The front-side dipole antenna may achieve impedance matching by changing the lengths of the facing long sides of the feed part for front-side hot element and the feed part for front-side ground element, and the back-side dipole antenna may achieve impedance matching by changing the lengths of the facing long sides of the feed part for back-side hot element and the feed part for back-side ground element.

The front-side dipole antenna may be constituted by a front-side bowtie antenna, and the back-side dipole antenna may be constituted by a back-side bowtie antenna.

The front-side bowtie antenna and/or the back-side bowtie antenna may have, at side surfaces of an area between the front-side surface and the back-side surface, a side element part for antenna performance adjustment extending from the front-side bowtie antenna and/or the back-side bowtie antenna.

The front-side dipole antenna may have a front-side folded element extending from the front-side surface to the back-side surface, the back-side dipole antenna may have a back-side folded element extending from the back-side surface to the front-side surface, the front-side folded element may be disposed in an area within the back-side surface where the back-side dipole antenna is absent, and the back-side folded element may be disposed in an area within the front-side surface where the front-side dipole antenna is absent.

Coaxial cables connected respectively to the front-side feed point and the back-side feed point may be wired in a space between the front-side surface and the back-side surface.

The MIMO antenna device may further include a front-side substrate having the front-side feed point and a back-side substrate having the back-side feed point, the front-side and back-side substrates being disposed between the front-side surface and the back-side surface.

The front-side substrate and the back-side substrate may be constituted as front and back surfaces of a single substrate.

The front-side dipole antenna and the back-side dipole antenna may be respectively arranged on crossing diagonal lines of a rectangular parallelepiped case.

The MIMO antenna device may further include: a second front-side dipole antenna being disposed on the front-side surface, including a second front-side hot element extending from the long-side feed part for front-side hot element and a second front-side ground element extending from the long-side feed part for front-side ground element, having a different target frequency as that of the front-side dipole antenna, and disposed so as to cross the front-side dipole antenna, and a second back-side dipole antenna being disposed on the back-side surface, including a second back-side hot element extending from the long-side feed part for back-side hot element and a second back-side ground element extending from the long-side feed part for back-side ground element, having the same target frequency as that of the second front-side dipole antenna, and disposed so as to cross the back-side dipole antenna.

Advantageous Effects of the Invention

The MIMO antenna according to the present invention is advantageously capable of reducing interference between antennas over a wide band and being miniaturized.

BRIEF DESCRIPTION OF THE DRAWINGS

Referring now to the attached drawings which form a part of this original disclosure, illustrative embodiments are shown.

DETAILED DESCRIPTION OF EMBODIMENTS

Figure 1A:
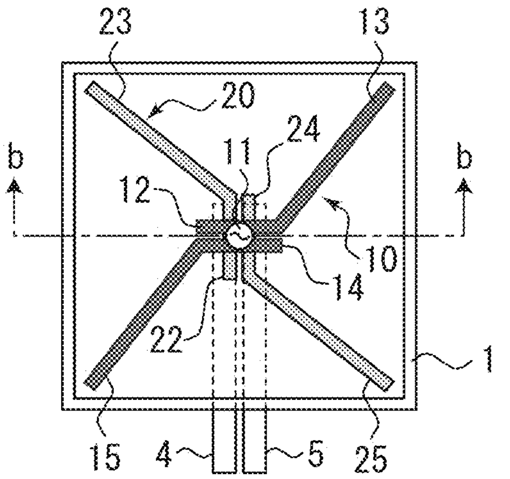
FIGS. 1A and 1B are schematic views for explaining a MIMO antenna device according to one illustrated embodiment.
Figure 1B:
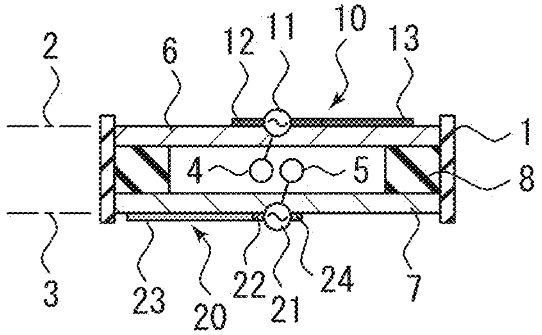

Hereinafter, an embodiment for practicing the present invention will be described with illustrated examples. FIG. 1 is a schematic view for explaining a MIMO antenna device according to the present invention. FIG. 1A is a top view, and FIG. 1B is a cross-sectional view taken along the line b-b. In the drawings, the same reference numerals denote the same parts. As illustrated, the MIMO antenna device according to the present invention that performs spatial multiplex transmission is mainly composed of a front-side dipole antenna 10 and a back-side dipole antenna 20. The MIMO antenna device according to the present invention may be housed in, for example, a rectangular parallelepiped case 1. The case 1 may be a small one having a size of, for example, 80 mm×80 mm×15 mm. The illustrated front-side dipole antenna 10 and the back-side dipole antenna 20 are each constituted by a linear element.

The front-side dipole antenna 10 is disposed on a front-side surface 2. The front-side dipole antenna 10 includes a front-side feed point 11, a long-side feed part 12 for front-side hot element, a front-side hot element 13, a long-side feed part 14 for front-side ground element, and a front-side ground element 15. That is, the front-side dipole antenna 10 is a dipole antenna that uses the front-side hot element 13 and the front-side ground element 15.

The front-side feed point 11 is connected with a front-side coaxial cable 4 as needed. The long-side feed part 12 for front-side hot element is connected to the front-side feed point 11 at its long side. As illustrated, the long-side feed part 12 for front-side hot element has a long side extending in its longitudinal direction and is connected to the front-side feed point 11 in the vicinity of the center of the long side in the longitudinal direction. More specifically, the hot side of the front-side feed point 11 is connected to the long side of the long-side feed part 12 for front-side hot element.

The front-side hot element 13 extends from the long-side feed part 12 for front-side hot element. The illustrated front-side hot element 13 extends obliquely in the upper-right direction from the right side of the long-side feed part 12 for front-side hot element in a top view. As described above, one of the two elements of the front-side dipole antenna 10 is a bent-shaped element formed by the long-side feed part 12 for front-side hot element and the front-side hot element 13.

The long-side feed part 14 for front-side ground element is connected to the front-side feed point 11 at its long side. As illustrated, the long-side feed part 14 for front-side ground element has a long side extending in its longitudinal direction and is connected to the front-side feed point 11 in the vicinity of the center of the long side in the longitudinal direction. More specifically, the ground side of the front-side feed point 11 is connected to the long side of the long-side feed part 14 for front-side ground element. The long side of the long-side feed part 14 for front-side ground element and the long side of the long-side feed part 12 for front-side hot element face each other in parallel with a predetermined interval therebetween. That is, the front-side feed point 11 is sandwiched in the up-down direction in the drawing by the long-side feed part 12 for front-side hot element and the long-side feed part 14 for front-side ground element.

The front-side ground element 15 extends from the long-side feed part 14 for front-side ground element. The front-side ground element 15 is disposed point-symmetric to the front-side hot element 13 with respect to the front-side feed point 11 in an offset manner. That is, the front-side ground element 15 and the front-side hot element 13 extend in the mutually opposite directions with respect to the front-side feed point 11 and are disposed offset from each other in the left-right direction in the drawing due to the presence of the long-side feed part 12 for front-side hot element and the long-side feed part 14 for front-side ground element. More specifically, the illustrated front-side ground element 15 extends obliquely in the lower-left direction from the left side of the long-side feed part 14 for front-side ground element in a top view. As described above, the other one of the two elements of the front-side dipole antenna 10 is a bent-shaped element formed by the long-side feed part 14 for front-side ground element and the front-side ground element 15.

For example, the thus configured front-side dipole antenna 10 may be disposed on a front-side substrate 6 constituting the front-side surface 2. The front-side feed point 11 may also be disposed on the front-side substrate 6. For example, the front-side substrate 6 may be disposed on a resin base 8. The front-side substrate 6 is connected with the coaxial cable 4 and connected therethrough to an external device (not illustrated). The front-side surface 2 need not necessarily be flat but may be curved to some extent.

The back-side dipole antenna 20 has basically the same configuration as the front-side dipole antenna 10. The back-side dipole antenna 20 is disposed on a back-side surface 3 facing the front-side surface 2. The front-side surface 2 and the back-side surface 3 need not necessarily face each other in parallel as illustrated but may face each other obliquely to some extent provided that they are arranged at a certain interval. Like the front-side surface 2, the back-side surface 3 need not necessarily be flat but may be curved to some extent. The back-side dipole antenna 20 is an antenna for the same frequency band as the front-side dipole antenna 10 and has basically the same configuration as the front-side dipole antenna 10. The back-side dipole antenna 20 includes a back-side feed point 21, a long-side feed part 22 for back-side hot element, a back-side hot element 23, a long-side feed part 24 for back-side ground element, and a back-side ground element 25. That is, the back-side dipole antenna 20 is a dipole antenna that uses the back-side hot element 23 and the back-side ground element 25.

The back-side feed point 21 is connected with a back-side coaxial cable 5 as needed. The long-side feed part 22 for back-side hot element is connected to the back-side feed point 21 at its long side. As illustrated, the long-side feed part 22 for back-side hot element has a long side extending in its longitudinal direction and is connected to the back-side feed point 21 in the vicinity of the center of the long side in the longitudinal direction. More specifically, the hot side of the back-side feed point 21 is connected to the long side of the long-side feed part 22 for back-side hot element.

The back-side hot element 23 extends from the long-side feed part 22 for back-side hot element. The illustrated back-side hot element 23 extends obliquely in the upper-left direction from the upper side of the long-side feed part 22 for back-side hot element in a top view. As described above, one of the two elements of the back-side dipole antenna 20 is a bent-shaped element formed by the long-side feed part 22 for back-side hot element and the back-side hot element 23.

The long-side feed part 24 for back-side ground element is connected to the back-side feed point 21 at its long side. As illustrated, the long-side feed part 24 for back-side ground element has a long side extending in its longitudinal direction and is connected to the back-side feed point 21 in the vicinity of the center of the long side in the longitudinal direction. More specifically, the ground side of the back-side feed point 21 is connected to the long side of the long-side feed part 24 for back-side ground element. The long side of the long-side feed part 24 for back-side ground element and the long side of the long-side feed part 22 for back-side hot element face each other in parallel with a predetermined interval therebetween. That is, the back-side feed point 21 is sandwiched in the left-right direction in the drawing by the long-side feed part 22 for back-side hot element and the long-side feed part 24 for back-side ground element.

The back-side ground element 25 extends from the long-side feed part 24 for back-side ground element. The back-side ground element 25 is disposed point-symmetric to the back-side hot element 23 with respect to the back-side feed point 21 in an offset manner. That is, the back-side ground element 25 and the back-side hot element 23 extend in the mutually opposite directions with respect to the back-side feed point 21 and are disposed offset from each other in the up-down direction in the drawing due to the presence of the long-side feed part 22 for back-side hot element and the long-side feed part 24 for back-side ground element. More specifically, the illustrated back-side ground element 25 extends obliquely in the lower-right direction from the lower side of the long-side feed part 24 for back-side ground element in a top view. As described above, the other one of the two elements of the back-side dipole antenna 20 is a bent-shaped element formed by the long-side feed part 24 for back-side ground element and the back-side ground element 25.

For example, the thus configured back-side dipole antenna 20 may be disposed on a back-side substrate 7 constituting the back-side surface 3. The back-side feed point 21 may also be disposed on the back-side substrate 7. For example, the back-side substrate 7 may be disposed on the side opposite to the front-side substrate 6 with respect to the resin base 8. The back-side substrate 7 is connected with the coaxial cable 5 and connected therethrough to an external device (not illustrated). The back-side surface 3 need not necessarily be flat but may be curved to some extent.

As illustrated, the front-side dipole antenna 10 and the back-side dipole antenna 20 are arranged such that the front-side feed point 11 and the back-side feed point 21 substantially overlap each other in atop view. The front-side feed point 11 and the back-side feed point 21 need not necessarily overlap completely each other in a top view, depending on the type of cable wiring or assembly restrictions but may be arranged offset from each other to some extent. Further, as the most distinctive feature of the present invention, the long-side feed part 12 for front-side hot element and the long-side feed part 14 for front-side ground element are arranged perpendicular to the long-side feed part 22 for back-side hot element and the long-side feed part 24 for back-side ground element. That is, the front-side dipole antenna 10 and the back-side dipole antenna 20 are arranged so as to be rotationally shifted from each other by 90° with the front-side feed point 11 and the back-side feed point 21 as a center.

As described above, in the MIMO antenna device according to the present invention, the feed part of the dipole antenna in the vicinity of a portion around the feed point where the largest amount of current is applied is constituted by an element having a long side, and two such long side feed parts are perpendicularly arranged front and back, whereby it is possible to reduce interference between antennas over a wide band.

The long-side feed part 12 for front-side hot element and the long-side feed part 14 for front-side ground element face each other in parallel along their long sides with a predetermined interval therebetween. In the MIMO antenna device according to the present invention, it is possible to achieve impedance matching of the front-side dipole antenna 10 by changing the lengths of the facing long sides, more specifically, by changing the lengths in the longitudinal direction of the long-side feed part 12 for front-side hot element and the long-side feed part 14 for front-side ground element.

Similarly, the long-side feed part 22 for back-side hot element and the long-side feed part 24 for back-side ground element face each other in parallel along their long sides with a predetermined interval therebetween, so that it is possible to achieve impedance matching of the back-side dipole antenna 20 by changing the lengths of the facing long sides, more specifically, by changing the lengths in the longitudinal direction of the long-side feed part 22 for back-side hot element and the long-side feed part 24 for back-side ground element.

In the illustrated example, the long-side feed part for hot element and the long-side feed part for ground element face each other in parallel with a predetermined interval therebetween so as not to overlap each other in a top view. However, the present invention is not limited to this. For example, the long-side feed part for hot element and the long-side feed part for ground element may face each other in parallel with a predetermined interval therebetween in the up-down direction so as to overlap each other in a top view.

Further, in the MIMO antenna device according to the present invention, two dipole antennas having substantially the same shape may be arranged so as to cross each other in an X-shape in a top view. That is, the two dipole antennas may be arranged so as to be rotationally shifted from each other by 90° in a top view as in the illustrated example, or the two dipole antennas in the illustrated state may each be turned over. It is only necessary that the long-side feed part 12 for front-side hot element and the long-side feed part 14 for front-side ground element are arranged perpendicular to the long-side feed part 22 for back-side hot element and the long-side feed part 24 for back-side ground element. Further, it is only necessary that the front-side dipole antenna 10 and the back-side dipole antenna 20 are arranged front and back so as to face and cross each other such that the main parts of the front-side hot element 13 and the front-side ground element 15 do not overlap the back-side hot element 23 and the back-side ground element 25.

While the front-side substrate 6 and the back-side substrate 7 are respectively arranged on the front and back sides of the base 8 in the illustrated example, the present invention is not limited to this, but the front-side substrate 6 and the back-side substrate 7 may be constituted as front and back surfaces of a single substrate. That is, the front and back surfaces of a single substrate may be used respectively as the front-side substrate and the back-side substrate. Further, the front-side dipole antenna 10 and the back-side dipole antenna 20 may be patterned and formed on the front-side substrate 6 and the back-side substrate 7 by, for example, etching of a copper foil of the substrate. Alternatively, the front-side dipole antenna 10 and the back-side dipole antenna 20 may each be provided in the form of a sheet metal, a conductive film, or a conductive wire. In a case where the conductive wire is used, the conductive wire may be bent in an L-shape so as to be disposed in a floated state from the substrate.

Although the illustrated example looks like a cross-dipole antenna in a top view, the front-side dipole antenna 10 and the back-side dipole antenna 20 of the MIMO antenna device according to the present invention are not arranged on the same plane and are not intended to obtain a circularly polarized wave, so it differs from the cross-dipole antenna in terms of purpose, configuration, and effect.

Further, in the illustrated example, the coaxial cables 4 and 5 are used to perform unbalanced feeding to the front-side feed point 11 and the back-side feed point 21. In the MIMO antenna device according to the present invention, the coaxial cables 4 and 5 connected respectively to the front-side feed point 11 and the back-side feed point 21 may be wired in a space between the front-side surface 2 and the back-side surface 3. That is, the front-side dipole antenna 10 and the back-side dipole antenna 20 are disposed on the outermost sides in the thickness direction, and the coaxial cables 4 and 5 are wired using a space therebetween. This makes it possible to achieve miniaturization by making efficient use of the limited area. The MIMO antenna device according to the present invention may use a balun or the like if necessary.

According to the thus configured MIMO antenna device of the present invention, it is possible to reduce interference between the front-side dipole antenna 10 and the back-side dipole antenna 20 over a wide band. This in turn allows the antenna device to be accommodated in a small case. Therefore, for example, the antenna size can be reduced to a level that can be accommodated in the instrument panel of a vehicle.

The illustrated front-side dipole antenna 10 and the back-side dipole antenna 20 are respectively arranged on crossing diagonal lines of the rectangular parallelepiped case 1. When the antenna elements are thus arranged in an X-shape in the case 1 in a top view, the element length can be increased as compared with a case where the antenna elements are arranged in a cross shape in a top view. However, the present invention is not limited to this, the front-side dipole antenna 10 and the back-side dipole antenna 20 may be arranged in a cross shape in the case 1 in a top view.

Figure 2:
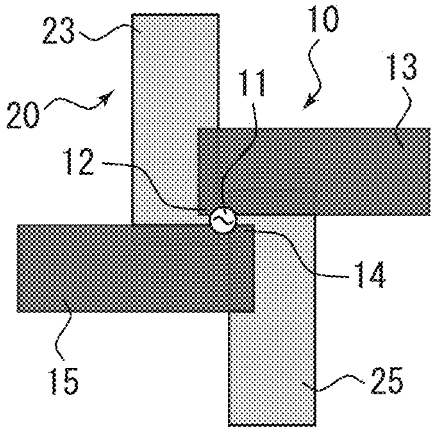
FIG. 2 is a schematic top view for explaining another example of the dipole antenna for the MIMO antenna device according to the illustrated embodiment.

FIG. 2 is a schematic top view for explaining another example of the dipole antenna for the MIMO antenna device according to the present invention. In the drawing, the same reference numerals as those in FIG. 1 denote the same parts. In FIG. 2, only the front-side dipole antenna 10 and the back-side dipole antenna 20 are illustrated for descriptive convenience. As illustrated, in this example, the front-side dipole antenna 10 and the back-side dipole antenna 20 are arranged in a cross shape in a top view. Further, in the illustrated example, the front-side dipole antenna 10 and the back-side dipole antenna 20 each include wide linear elements each having a width larger than that of the linear element illustrated in FIG. 1. The long-side feed part 12 for front-side hot element and the front-side hot element 13 are integrally constituted by a wide linear element. More specifically, a part of a rectangular conductor is used as the long-side feed part 12 for front-side hot element, and the remaining part thereof is used as the front-side hot element 13. Similarly, the long-side feed part 14 for front-side ground element and the front-side ground element 15 are integrally constituted by a wide linear element. More specifically, a part of a rectangular conductor is used as the long-side feed part 14 for front-side ground element, and the remaining part thereof is used as the front-side ground element 15.

Further, in this example as well, the long-side feed part 14 for front-side ground element is disposed so as to face the long side of the long-side feed part 12 for front-side hot element with a predetermined interval therewith. That is, the front-side feed point 11 is sandwiched in the up-down direction in the drawing by the long-side feed part 12 for front-side hot element and the long-side feed part 14 for front-side ground element.

The thus configured front-side dipole antenna 10 and the back-side dipole antenna 20 having substantially the same shape as the front-side dipole antenna 10 are arranged so as to be rotationally shifted from each other by 90° with the front-side feed point 11 and the back-side feed point 21 as a center. As is the case with the example illustrated in FIG.

1, the long-side feed part 12 for front-side hot element and the long-side feed part 14 for front-side ground element are arranged perpendicular to the long-side feed part 22 for back-side hot element and the long-side feed part 24 for back-side ground element. Since the long-side feed parts can be arranged perpendicular to each other, it is possible to reduce interference between antennas over a wide band.

Figure 3:
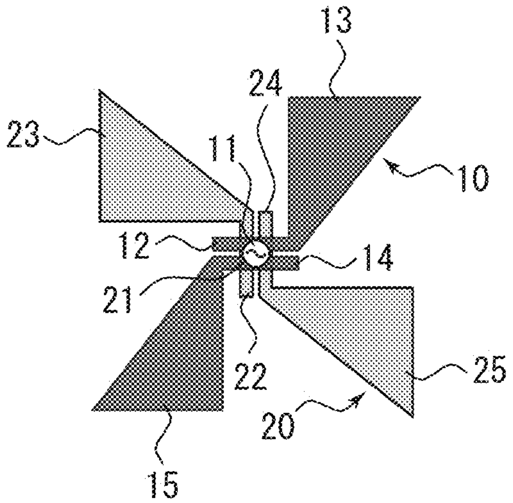
FIG. 3 is a schematic top view for explaining another example of the dipole antenna for the MIMO antenna device according to the illustrated embodiment.

FIG. 3 is a schematic top view for explaining another example of the dipole antenna for the MIMO antenna device according to the present invention. In the drawing, the same reference numerals as those in FIG. 1 denote the same parts. In FIG. 3, only the front-side dipole antenna 10 and the back-side dipole antenna 20 are illustrated for descriptive convenience. In this example, the front-side dipole antenna 10 is constituted by a front-side bowtie antenna, and the back-side dipole antenna 20 is constituted by a back-side bowtie antenna, and these two bowtie antennas are arranged so as to cross each other in atop view. A typical bowtie antenna has a self-complementary structure, and the illustrated front-side dipole antenna 10 and the back-side dipole antenna 20 each constituted by the bowtie antenna have a structure close to the self-complementary structure. That is, although they have the self-complementary structure, they need not have a line-symmetric shape. Further, although they are each a dipole antenna, the hot and ground elements need not completely be the same in shape.

In the MIMO antenna device according to the present invention, even in the front-side dipole antenna 10 and the back-side dipole antenna 20 each constituted by the thus configured bowtie antenna, the long-side feed part 12 for front-side hot element and the long-side feed part 14 for front-side ground element are arranged perpendicular to the long-side feed part 22 for back-side hot element and the long-side feed part 24 for back-side ground element.

Figure 4:
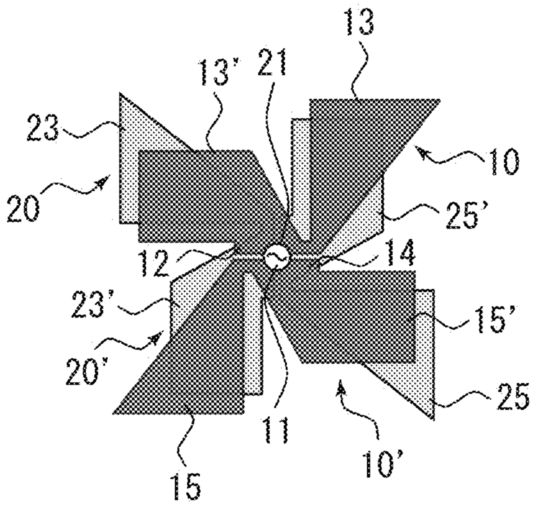
FIG. 4 is a schematic top view for explaining another example of the dipole antenna for the MIMO antenna device according to the illustrated embodiment.

FIG. 4 is a schematic top view for explaining another example of the dipole antenna for the MIMO antenna device according to the present invention. In the drawing, the same reference numerals as those in FIG. 1 denote the same parts. In this example, antenna elements are provided so as to correspond to three frequency bands of "Low", "Mid", and "High". There are provided two dipole antennas arranged so as to cross each other on the front-side surface 2 and two dipole antennas arranged so as to cross each other on the back-side surface 3. That is, two dipole antennas cross each other on each of the front and back surfaces. The front-side dipole antenna 10 and the back-side dipole antenna 20 have basically the same shape as those illustrated in FIG. 3. That is, the front-side dipole antenna 10 and the back-side dipole antenna 20 are constituted by bowtie antennas and used as elements for "Low", for example.

Further, there are provided a second front-side dipole antenna 10' and a second back-side dipole antenna 20' in the illustrated example. The second front-side dipole antenna 10' is an antenna for a different frequency band from that of the front-side dipole antenna 10 and is used as a composite element for "Mid" and "High", for example. The second front-side dipole antenna 10' is disposed on the front-side surface 2. The second front-side dipole antenna 10' includes a second front-side hot element 13' and a second front-side ground element 15'. The second front-side hot element 13' extends from the long-side feed part 12 for front-side hot element. The second front-side ground element 15' extends from the long-side feed part 14 for front-side ground element. More specifically, the front-side dipole antenna 10 and the second front-side dipole antenna 10' extend from different portions of the long-side feed part 12 for front-side hot element.

The second front-side dipole antenna 10' is disposed so as to cross the front-side dipole antenna 10. That is, the second front-side hot element 13' and the second front-side ground element 15' may be disposed at positions where the front-side hot element 13 and the front-side ground element 15 are absent. The front-side dipole antenna 10 and the second front-side dipole antenna 10' are connected in common to the front-side feed point 11. Thus, a three-band composite element for "Low", "Mid", and "High" is provided.

The second back-side dipole antenna 20' has basically the same configuration as the second front-side dipole antenna 10'. The second back-side dipole antenna 20' is an antenna for the same frequency band as that of the second front-side dipole antenna 10'. The second back-side dipole antenna 20' is disposed on the back-side surface 3. The second back-side dipole antenna 20' includes a second back-side hot element 23' and a second back-side ground element 25'. The second back-side hot element 23' extends from the long-side feed part 22 for back-side hot element. The second back-side ground element 25' extends from the long-side feed part 24 for back-side ground element. More specifically, the back-side dipole antenna 20 and the second back-side dipole antenna 20' extend from different portions of the long-side feed part 22 for back-side hot element.

The second back-side dipole antenna 20' is disposed so as to cross the back-side dipole antenna 20. That is, the second back-side hot element 23' and the second back-side ground element 25' may be disposed at positions where the back-side hot element 23 and the back-side ground element 25 are absent. The back-side dipole antenna 20 and the second back-side dipole antenna 20' are connected in common to the back-side feed point 21. Thus, a three-band composite element for "Low", "Mid", and "High" is provided.

Even in such a composite element, the dipole antennas may be arranged so as to be rotationally shifted from each other by 90° with the front-side feed point 11 and the back-side feed point 21 as a center. At this time, the front-side hot element 13 and the second back-side ground element 25' overlap each other in a top view. Further, the front-side ground element 15 and the second back-side hot element 23' overlap each other in a top view. However, the front-side dipole antenna 10 and second back-side dipole antenna 20' have different target frequencies, so that interference between the antennas is reduced. Further, in this example as well, the long-side feed part 12 for front-side hot element and the long-side feed part 14 for front-side ground element are arranged perpendicular to the long-side feed part 22 for back-side hot element and the long-side feed part 24 for back-side ground element. Therefore, since the long-side feed parts can be arranged perpendicular to each other, it is possible to reduce interference between antennas over a wide band.

Figure 5:
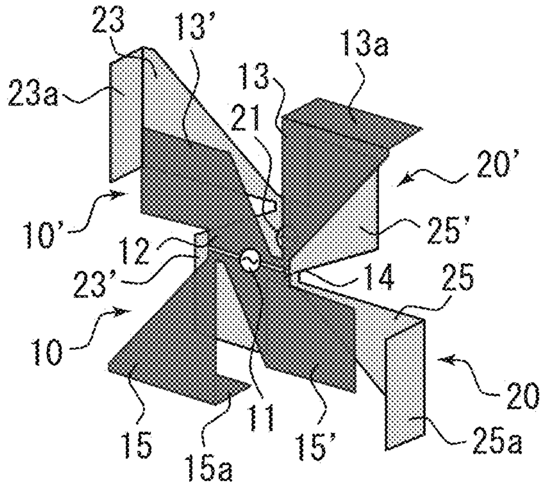
FIG. 5 is a schematic perspective view for explaining another example of the dipole antenna for the MIMO antenna device according to the illustrated embodiment.

FIG. 5 is a schematic perspective view for explaining another example of the dipole antenna for the MIMO antenna device according to the present invention. In the drawing, the same reference numerals as those in FIG. 4 denote the same parts. In this example, a bowtie antenna is provided with a side element for antenna performance adjustment. As illustrated, side elements **13*a* and 15*a* for front side and side elements 23*a* and 25*a* for back side are provided at side surfaces of the area between the front-side surface 2 and the back-side surface 3. The front-side hot element 13 extends up to the end portion of the front-side surface 2, and the side element 13*a* extends from the opening end thereof. Further, the front-side ground element 15 extends up to the end portion of the front-side surface 2, and the side element 15*a* extends from the opening end thereof. Similarly, the back-side hot element 23 extends up to the end portion of the back-side surface 3, and the side element 23***a* extends from the opening end thereof. Further, the back-side ground element 25 extends up to the end portion of the back-side surface 3, and the side element 25*a* extends from the opening end thereof. That is, the side elements 13*a*, 15*a*, 23*a*, and 25*a* may be formed by bending their corresponding elements. When the side elements 13*a*, 15*a*, 23*a*, and 25*a* are thus formed so as to extend from the opening ends of the elements, element lengths can be made longer. By thus three-dimensionally arranging the elements, it is possible to adjust antenna performance around the lower limit frequency of the dipole antenna while making efficient use of the limited area inside the case 1. The shape and position of the side element(s) are not limited to those illustrated in FIG. 5 and may be determined while observing antenna performance.

Figure 6:
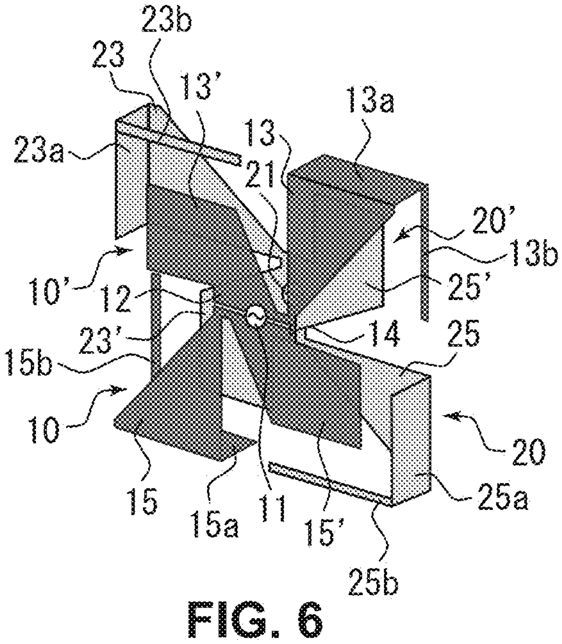
FIG. 6 is a schematic perspective view for explaining another example of the dipole antenna for the MIMO antenna device according to the illustrated embodiment.

FIG. 6 is a schematic perspective view for explaining another example of the dipole antenna for the MIMO antenna device according to the present invention. In the drawing, the same reference numerals as those in FIG. 5 denote the same parts. In this example, the bowtie antenna illustrated in FIG. 5 further has a folded element extending up to the opposite side surface. As illustrated, the front-side dipole antenna 10 has front-side folded elements 13*b* and 15*b* extending from the front-side surface 2 to the back-side surface 3. That is, the front-side hot element 13 extends from the side element 13*a* to the front-side folded element 13*b*. The front-side ground element 15 extends from the side element 15*a* to the front-side folded element 15*b*. Similarly, the back-side dipole antenna 20 has back-side folded elements 23*b* and 25*b* extending from the back-side surface 3 to the front-side surface 2. That is, the back-side hot element 23 extends from the side element 23*a* to the back-side folded element 23*b*. The back-side ground element 25 extends from the side element 25*a* to the back-side folded element 25*b*.

In this case, the front-side folded elements 13*b* and 15*b* may be disposed in an area within the back-side surface 3 where the back-side dipole antenna 20 is absent. Similarly, the back-side folded elements 23*b* and 25*b* may be disposed in an area within the front-side surface 2 where the front-side dipole antenna 10 is absent. By thus three-dimensionally arranging the elements, it is possible to adjust antenna performance around the lower limit frequency of the dipole antenna while making efficient use of the limited area inside the case 1. The shape and position of the folded element are not limited to those illustrated in FIG. 6 and may be determined while observing antenna performance.

Figure 7:
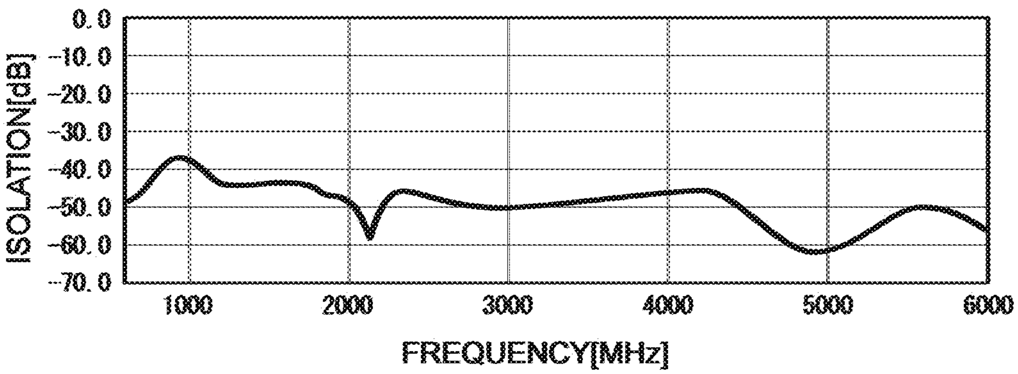
FIG. 7 is a graph illustrating isolation characteristics with respect to the frequency of the MIMO antenna device according to the illustrated embodiment.

FIG. 7 is a graph illustrating isolation characteristics with respect to the frequency of the MIMO antenna device according to the present invention. In this graph, the horizontal axis represents frequency, and the vertical axis represents isolation. The isolation characteristics in this graph are obtained from the MIMO antenna device of the example illustrated in FIG. 6. As can be seen from the graph of FIG. 7, the MIMO antenna device according to the present invention exhibits satisfactory isolation characteristics of 35 dB or higher over a wide band.

The MIMO antenna device according to the present invention is not limited to the above-described illustrated examples, but may be variously modified within the scope of the present invention.

The invention claimed is:

1. A MIMO antenna device that performs spatial multiplex transmission, the MIMO antenna device comprising:

a front-side dipole antenna disposed on a front-side surface; and a back-side dipole antenna which is an antenna for the same frequency band as the front-side dipole antenna and which is disposed on a back-side surface opposite to the front-side surface, the front-side dipole antenna including:

a front-side feed point;

a long-side feed part for front-side hot element connected at its long side to the front-side feed point;

a front-side hot element extending from the long-side feed part for front-side hot element;

a long-side feed part for front-side ground element connected at its long side to the front-side feed point, the long side facing in parallel the long side of the long-side feed part for front-side hot element with a predetermined interval; and a front-side ground element extending from the long-side feed part for front-side ground element and disposed point-symmetric to the front-side hot element with respect to the front-side feed point in an offset manner, the back-side dipole antenna including:

a back-side feed point;

a long-side feed part for back-side hot element connected at its long side to the back-side feed point;

a back-side hot element extending from the long-side feed part for back-side hot element;

a long-side feed part for back-side ground element connected at its long side to the back-side feed point, the long side facing in parallel the long side of the long-side feed part for back-side hot element with a predetermined interval; and a back-side ground element extending from the long-side feed part for back-side ground element and disposed point-symmetric to the back-side hot element with respect to the back-side feed point in an offset manner, wherein the front-side dipole antenna and the back-side dipole antenna are arranged such that the front-side feed point and the back-side feed point substantially overlap each other in a top view and that the long-side feed part for front-side hot element and the long-side feed part for front-side ground element are arranged perpendicular to the long-side feed part for back-side hot element and the long-side feed part for back-side ground element.

2. The MIMO antenna device according to claim 1, wherein the front-side dipole antenna achieves impedance matching by changing the lengths of the facing long sides of the feed part for front-side hot element and the feed part for front-side ground element, and the back-side dipole antenna achieves impedance matching by changing the lengths of the facing long sides of the feed part for back-side hot element and the feed part for back-side ground element.

3. The MIMO antenna device according to claim 1, wherein the front-side dipole antenna is constituted by a front-side bowtie antenna, and the back-side dipole antenna is constituted by a back-side bowtie antenna.

4. The MIMO antenna device according to claim 3, wherein the front-side bowtie antenna and/or the back-side bowtie antenna has, at side surfaces of an area between the front-side surface and the back-side surface, a side element part for antenna performance adjustment extending from the front-side bowtie antenna and/or the back-side bowtie antenna.

5. The MIMO antenna device according to claim 1, wherein the front-side dipole antenna has a front-side folded element extending from the front-side surface to the back-side surface, the back-side dipole antenna has a back-side folded element extending from the back-side surface to the front-side surface, the front-side folded element is disposed in an area within the back-side surface where the back-side dipole antenna is absent, and the back-side folded element is disposed in an area within the front-side surface where the front-side dipole antenna is absent.

6. The MIMO antenna device according to claim 1, wherein coaxial cables connected respectively to the front-side feed point and the back-side feed point are wired in a space between the front-side surface and the back-side surface.

7. The MIMO antenna device according to claim 1, further comprising a front-side substrate having the front-side feed point and a back-side substrate having the back-side feed point, the front-side and back-side substrates being disposed between the front-side surface and the back-side surface.

8. The MIMO antenna device according to claim 7, wherein the front-side substrate and the back-side substrate are constituted as front and back surfaces of a single substrate.

9. The MIMO antenna device according to claim 1, wherein the front-side dipole antenna and the back-side dipole antenna are respectively arranged on crossing diagonal lines of a rectangular parallelepiped case.

10. The MIMO antenna device according to claim 1, further comprising a second front-side dipole antenna being disposed on the front-side surface, including a second front-side hot element extending from the long-side feed part for front-side hot element and a second front-side ground element extending from the long-side feed part for front-side ground element, having a different target frequency as that of the front-side dipole antenna, and disposed so as to cross the front-side dipole antenna, and a second back-side dipole antenna being disposed on the back-side surface, including a second back-side hot element extending from the long-side feed part for back-side hot element and a second back-side ground element extending from the long-side feed part for back-side ground element, having the same target frequency as that of the second front-side dipole antenna, and disposed so as to cross the back-side dipole antenna.

* * * * *